United States Patent
Siegl

(10) Patent No.: US 11,794,378 B2
(45) Date of Patent: Oct. 24, 2023

(54) METHOD FOR RECLAIMING THERMOPLASTIC MATERIALS INTENDED FOR RECYCLING

(71) Applicant: ALPLA WERKE ALWIN LEHNER GMBH & CO. KG, Hard (AT)

(72) Inventor: Robert Siegl, Dornbirn (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 0 days.

(21) Appl. No.: 17/266,983

(22) PCT Filed: Aug. 6, 2019

(86) PCT No.: PCT/EP2019/071154
§ 371 (c)(1),
(2) Date: Feb. 8, 2021

(87) PCT Pub. No.: WO2020/030657
PCT Pub. Date: Feb. 13, 2020

(65) Prior Publication Data
US 2021/0316484 A1 Oct. 14, 2021

(30) Foreign Application Priority Data
Aug. 6, 2018 (CH) .................................. 00955/18

(51) Int. Cl.
*B29B 17/02* (2006.01)
*B29K 67/00* (2006.01)
*B29K 105/26* (2006.01)
*B29B 17/00* (2006.01)

(52) U.S. Cl.
CPC ........ *B29B 17/02* (2013.01); *B29B 2017/001* (2013.01); *B29B 2017/0015* (2013.01); *B29B 2017/0224* (2013.01); *B29B 2017/0279* (2013.01); *B29K 2067/003* (2013.01); *B29K 2105/26* (2013.01)

(58) Field of Classification Search
CPC .............. B29B 17/02; B29B 2017/001; B29B 2017/0015; B29B 2017/0224; B29B 2017/0279; B29B 17/00; B29B 2017/0213; B29K 2067/003; B29K 2105/26; Y02W 30/52; Y02W 30/62
See application file for complete search history.

(56) References Cited

U.S. PATENT DOCUMENTS

| 4,046,825 | A | * | 9/1977 | Owen | C07C 1/207 208/135 |
| 5,171,308 | A | * | 12/1992 | Gallagher | C08G 63/6886 428/36.1 |
| 5,232,885 | A | * | 8/1993 | Clark | B01J 23/90 502/25 |
| 6,111,064 | A | * | 8/2000 | Maurer | C08G 63/78 526/71 |
| 2004/0140248 | A1 | | 7/2004 | Dauzvardis | |
| 2007/0015078 | A1 | * | 1/2007 | Suzuki | G03G 9/1139 430/123.58 |
| 2008/0199721 | A1 | * | 8/2008 | Scott | C09D 5/106 428/626 |
| 2013/0320577 | A1 | * | 12/2013 | Ishii | B29C 45/1643 264/36.12 |
| 2013/0345452 | A1 | * | 12/2013 | Janka | C07D 307/68 549/485 |
| 2017/0342320 | A1 | * | 11/2017 | Tsumori | C09K 11/616 |

FOREIGN PATENT DOCUMENTS

| DE | 4333221 A1 | 4/1995 | |
| EP | 0856537 A2 | 8/1998 | |
| EP | 2052827 A1 * | 4/2009 | ........ B29B 17/0036 |
| GB | 2492942 A * | 1/2013 | .......... B07C 5/3425 |
| JP | 2002086448 A * | 3/2002 | |
| WO | 2009152114 A1 | 12/2009 | |
| WO | 2012143692 A2 | 10/2012 | |
| WO | WO-2012143692 A2 * | 10/2012 | .......... B07C 5/3425 |

OTHER PUBLICATIONS

N N. "Buhler sets new trends in PET sorting" Internet Citation, Jul. 4, 2008 Retrieved from the Internet: http://www.buhlergroup.com/global/en/about-buhler/news/archive/details-buhler-sets-new-trends-in-pet-sorting.htm.

* cited by examiner

*Primary Examiner* — Jacob T Minskey
*Assistant Examiner* — Caroline Beha
(74) *Attorney, Agent, or Firm* — MORRISS O'BRYANT COMPAGNI CANNON, PLLC

(57) ABSTRACT

Presented and described is a method for reclaiming thermoplastic materials intended for recycling, such as, for example, polyethylene terephthalate (PET), in the form of flakes. According to the invention, in a first step, the flakes are exposed to an oxidative fluid and heat until contaminated flakes are modified such that, in a second step, they are separated from the remaining flakes as a result of this modification.

29 Claims, No Drawings

METHOD FOR RECLAIMING THERMOPLASTIC MATERIALS INTENDED FOR RECYCLING

CROSS-REFERENCE TO RELATED APPLICATIONS

This application is a national phase entry under 35 U.S.C. § 371 of PCT/EP2019/071154 filed Aug. 6, 2019, which claims priority to Swiss Patent Application No. 00955/18 filed Aug. 6, 2018, the entirety of each of which is incorporated by this reference.

BACKGROUND

Field of the Invention

The invention relates to a method for reclaiming thermoplastic materials intended for recycling. The invention also relates to a semi-finished product or plastic packaging, such as, for example, beverage bottles, which are produced with a thermoplastic material which has been reclaimed according to said method as well as a reclamation plant for executing said method.

State of the Related Art

Polyethylene terephthalate (in short: PET), a thermoplastic material, is currently used very often in the field of packaging of food products, soft drinks and water. Such plastic packaging should be fed to a large extent into the recycling stream and thus be processed again and again. For packaging of food, soft drinks, water and the like, PET packaging, in particular PET bottles, is used, which is made entirely from recycled PET. This 100% recycling rate is possible, but the exception, since impurities in the PET usually do not permit to achieve said 100%.

One of the known problems which arises with repeated recycling is the progressive yellowing, clouding and graying of the PET. With each subsequent recycling cycle, the PET becomes more yellow, cloudy and gray. The yellow tint can be compensated for by adding blue paint. With this color compensation, however, the PET becomes darker and grayer. A PET that has become continuously more yellow and/or darker with continued recycling stages can often no longer meet the optical requirements of high-quality packaging.

Another problem that arises with continued recycling is the increasing number of foreign bodies in the reclaim (broken bits of glass, foreign polymers, paper, wood, etc.), which increases with each subsequent cycle. Such foreign bodies themselves either cloud the PET or they act as seed crystals for crystallization nuclei, which lead to the PET crystallizing out locally, the clouding being increased by the additional crystalline structure.

Chemical impurities also have proven to be problematic, which either no longer allow the reclaim to be used directly for the food sector or, during further processing, form undesirable reaction products which no longer allow use in the food sector or for consumer goods.

In addition, PET bottles can contain polyamide in layers or in admixture to provide a barrier to oxygen and carbon dioxide. Such PET bottles provided with polyamides have a particularly negative effect on the yellow tinge of the reclaim, since polyamide yellows much more strongly than PET over time and at increased temperature. In addition, polyamide forms small polyamide domains in the PET reclaim, that scatter light and thus additionally cloud said PET reclaim. An attempt was therefore made not to include PET bottles with polyamide in the recycling stream.

Furthermore, PET bottles can be laminated with labels or sleeves based on polystyrene or PET G, which cannot be separated completely, and at the elevated temperatures can lead to a strong yellowing and adhesive bonds. Adhesives, paints and varnishing on the bottles, which cannot be separated from the reclaim and can lead to undesirable reaction products at elevated temperatures, are also particularly critical.

It is known to separate different thermoplastic materials by their physical properties such as near infrared absorption or density. After separation, the substantially homogenous thermoplastic material is washed and in doing so, contaminations, such as, for example, paper or adhesive are removed. When washing thermoplastic materials, said thermoplastic materials are basically not modified. The thermoplastic materials are only cleaned of impurities and brought into a form that enables further processing or reclaiming, for example as flakes, which are usually 2 to 30 mm$^2$ in size as ground material. It is also known to dehumidify the flakes by heating them in vacuum or in an oxygen-deficient environment, and in doing so, to remove any volatile contaminations. In special methods, such as solid state polymerization (SSP method), it is also possible to initiate another polycondensation by heating in a vacuum or with the exclusion of oxygen. Here it is possible, to increase the polymer chain length to the level of the original raw material. It is also already known to dry the flakes hot or cold before extrusion; but even with these known methods, attempts are made to dry as gently as possible in order to keep reactions or their consequences such as yellowing as low as possible.

A further known problem in the subsequent further processing of recycled flakes is that the elevated temperatures repeatedly lead to yellowing, which limits—as explained above—the usefulness of the recycled flakes and the intermediate products produced therefrom.

To counteract this yellowing, usually, in the production of packaging, particularly bottles, not only recycled thermoplastic materials is used, but a homogenous blend of recycled and newly produced thermoplastic materials is used. So far, for example, for PET bottles in the European Union, typically a mixture of 30% recycled PET and 70% of virgin PET was used.

In general, the aim is to increase the proportion of recycled thermoplastic material. Here, however, limitations come to light that are due to the discoloration, i.e., yellowing, graying, clouding, and the like, as well as due to chemical contamination of the recycled thermoplastic material. If the proportion of recycled thermoplastic material becomes too high, it is usually no longer possible to achieve the required optical and chemical properties in order to be able to produce high-quality packaging.

This is where the invention comes in. The method according to the invention provides a method that enables a reclaiming of thermoplastic materials, in particular polyethylene terephthalate (PET), in which the quality of the reclaimed thermoplastic material is further improved compared to the reclaiming methods known from the prior art. In particular, the method according to invention improves the quality of the reclaimed thermoplastic material to an extent that the thermoplastic material can be used as plastic packaging especially for food, and these packages provide a high quality impression. This quality impression is created, for example, in the case of beverage bottles through high transparency.

SUMMARY OF THE INVENTION

Reclaimed thermoplastic materials of high quality make it possible to further increase the proportion of reclaimed thermoplastic materials and, accordingly, to reduce the proportion of newly produced thermoplastic materials in the manufacture of semi-finished products or plastic packaging. The method according to the invention complements existing processing processes, is as economical as possible and takes into account ecological aspects.

In this case, the invention makes use of the realization that various types of contamination of the thermoplastic material to be recycled, when exposed to elevated temperatures, will result specifically in different reactions which can release reaction products and/or result in a discoloration, yellowing or adhesive bonds. This applies, inter alia, to foreign plastics, oxygen scavengers, oils, sugars, polyamides, polystyrenes, UV absorbers, especially when they react particularly rapidly with oxygen when exposed to heat and become discolored and, under certain circumstances, form undesired reaction products such as cyclic hydrocarbons (benzenes, xylenes, toluenes, phenols) or aldehydes (formaldehyde, acetaldehyde). Some of these contaminations are thermally unstable and modify, i.e., discolor, or cleave off low molecular weight reaction products due to the high temperatures.

DETAILED DESCRIPTION OF THE INVENTION

The invention relates to a method for reclaiming thermoplastic materials intended for recycling in the form of flakes. In a first step, the flakes are exposed to an oxidative fluid and heat until contaminations are modified by chemical and/or physical effects such that, in a second step, they can be separated from the flakes as a result of said modification. Chemical effects within the meaning of the invention can be, for example, the formation of reaction products or the cleaving off reaction products. Discoloration, yellowing, clouding or agglomerates formed as a result of clumping represent, for example, physical effects within the meaning of the invention.

In this case, the heating can take place both directly by convection of the heated oxidative fluid and indirectly by heat conduction, friction (sound) or radiation (microwave, UV, visible light, IR radiation). The oxidative fluid can take up and carry away already existing chemical contaminations and those contaminants which form only at elevated temperature. According to the invention, solid contaminations are identified on the basis of the previously described specific modifications (e.g., discoloration, clumping) that take place on these and on the contaminated flakes during the process.

A first separation of solid contaminations according to the second step can be done by sifting technologies, which in particular sift out sticky contaminations or contaminations that have become brittle and crumbly by the heat and oxidation treatment or have turned into dust.

The separation of discolored (yellowed, greened, grayed) solid contaminations can be carried out with standard sorting systems from well-known manufacturers such as Sesotec, Tomra, Bühler or Pellenc. The separation is preferably carried out while still in the hot state, i.e., above 90° C. Here, solid contaminations are identified as such and separated.

In one embodiment, the invention uses the CIELAB color model (also Lab colors, CIEL*a*b*) to identify discoloration. The color of plastics is therefore determined by the three parameters L, a, and b. The parameters are represented as L, a, b or often as L*a*b*. The L*a*b* color space (also: Lab colors, CIELAB, CIEL*a*b*) describes all perceptible colors. The most important properties of the L*a*b* color model include device independence and perception-relatedness, i.e.: colors are defined as they are perceived by a normal observer under a standard lighting condition, regardless of how they are generated or how they are reproduced. The color model is standardized in EN ISO 11664-4 "Colorimetry—Part 4: CIE 1976 L*a*b* Colour space".

The use of the CIELAB color model is explained below. The parameter L is a measure of the darkness. The higher the L value, the lighter the flakes. Flakes with values of L<65 are very dark and rather gray, whereas flakes with values of L>85 are light. For example, newly produced PET without recycled content (so-called virgin PET) can be readily produced with an L value above 85, e.g., L=89. There is also gray virgin PET, with L values below 85, which contains carbon dust, IR absorbers or other additives that cloud virgin PET.

The b value is a measure of the yellow-blue discoloration of the flakes. Yellowed flakes have, for example, a b value greater than 5 (b>5) which, in the case of greatly yellowed PET, can reach values of b>20. A negative b value describes the degree of blue coloration of the flakes. Virgin PET, for example, has b values between −3 and 0. The blue cast is produced by additives, for example cobalt compounds. For example, virgin PET is set to have a blue cast, as it inevitably becomes yellower during processing and consequently, the b value increases. The a value is a measure of the red-green discoloration of the flakes. In addition to the yellowing of the reclaim, the reclaim usually also turns green, which is compensated with red color, and with the color compensation the reclaim becomes darker if the green cast is to be suppressed by the additive color mixing.

With every recycling process that a thermoplastic material undergoes, the L value decreases whereas the b value increases. The a value tends to decrease to a comparatively small extent. The flakes themselves become more yellowish not only during the recycling runs, but the yellow cast is particularly enhanced by impurities which contaminate the flakes during a recycling cycle.

The advantageous embodiment variants of the invention listed below lead alone or in combination with one another to further improvements of the method according to the invention.

In a further embodiment, the method according to the invention is performed after performing generally well-known methods for reclaiming flakes. Such methods include washing the flakes, for example in alkaline solutions, or cold sorting to separate contaminants such as metals and other plastics. The separation according to the invention of the contaminations from the remaining flakes is preferably carried out prior to extrusion and granulation. The method according to the invention enables the polymer chain length to be increased to the level of the original raw material. Optionally it is possible, following the method according to the invention, to perform an SSP process in order to increase the polymer chain length further.

The determination of the discoloration of solid contaminations can be done by means of one or more optical sensors, and the discoloration can be assessed on the basis of the aforementioned CIELAB color model.

Experiments have shown that good qualities of reclaimed flakes are obtained, when flakes with a color b value of greater 0, or advantageously greater 4, are separated, i.e., eliminated from the flakes provided for the reclaiming. As a result of this selection, flakes are obtained for recycling, that have at most a low degree of yellowing.

Reclaimed flakes well suited for the production of transparent or glass-clear packaging are obtained when flakes with a distinct red cast, i.e., with a color a value less than minus 4 are separated and/or when flakes with a clear green cast, i.e., a color a value less than 4, are separated. Furthermore, the flakes should have a color L value that is greater than 50, and, as a consequence, flakes with a color L value less than 50 are separated according to the invention.

According to the invention, an air-gas mixture with an oxygen content of at least 5% may be used as a fluid.

Using the method according to the invention, in particular solid contaminations such as mixtures of thermoplastic materials with a radical scavenger, as well as adhesives, PVC and polystyrene can be separated. In order to ensure the rapid yellowing of these contaminations, an air-gas mixture with an oxygen content of at least 5% is used as the fluid and the flakes are exposed to temperatures in the range of 160° C. to 240° C. and advantageously in the range of 175° C. to 205° C. or the temperature range being 185° C. to 195° C. It is desired, to maintain the temperature of the fluid during the process substantially constant, with a variation of +/−15° C. being acceptable in order to regulate the temperature in the reaction space. The exposure of the flakes with the hot fluid can take between 5 minutes and 10 hours.

According to the invention, the process conditions are chosen such that the contaminations are forced to react and/or outgas while the process is being carried out and can be removed from the reaction space together with the oxidative fluid.

Dehumidified or dried flakes at a temperature of 90° C. to 200° C. may be supplied when using the process. Therefore, in order to prevent another contamination in particular with steam, the fluid, in an embodiment of the invention, has a relative moisture content in the order of magnitude of $10^{-6}\%$ and $10^{-2}\%$ when it is fed to the process. Said fed fluid is usually air, and, when it is fed to the process preferably has a dew point of −10° C. to −100° C. This allows the flakes to be dried to a water content of less than 50 ppm, while the fluid is passing through.

In particular, contaminated flakes and agglomerates, which are stuck or crumbled during the reactive processing, are separated or deposited in one embodiment of the invention by means of sifting technologies, such as, for example, mechanical sorting processes. The cause of the disruption of the flowability of the flakes is usually the high temperatures. Agitators and other assistance to support flowability can be used, so that the flakes do not stick or clump together too strong locally. In order to raise the crystallinity of the material and to obtain free-flowing granules, the temperature profile during the process can be chosen such that the thermoplastic materials crystallizes to an extent of more than 30% or advantageously more than 40%. At the same time, the crystallization drives out contaminations that are poorly or not at all soluble in the crystallized PET.

Another advantageous aspect of the method according to the invention is that contaminations with a molecular mass of less than 350 Da (Dalton), which have already migrated into the flakes, migrate out of the flakes and into the fluid by forced reactions due to the exposure to the hot fluid and the presence of oxygen, and can be easily separated from said fluid.

The present method according to the invention differs from well-known methods in that "contaminating" reactions are deliberately triggered in order to produce contaminations (yellowing, graying, benzene formation, phenol formation) in order to then separate them in a targeted manner.

Another advantageous aspect of the method according to the invention is that gaseous reaction products and other gases, which form during the execution of the method, or migrate out of the flakes, together with the oxidative fluid can be separated from the process and thus removed from the process and discharged. The method according to the invention thus also enables reaction products and the other gases to be removed from the flakes in addition to the solid contaminations.

The method according to the invention may be executed with homogenously presorted flakes. This means that, for example, only flakes of one type of plastic are treated in said method. If the flakes to be reclaimed are made of polyethylene terephthalate (PET), then, apart from the solid contaminations and other impurities, no other thermoplastic materials are reclaimed together with the flakes of polyethylene terephthalate (PET).

The method according to the invention is particularly suitable for reclaiming flakes made of polyethylene terephthalate (PET) and can be used with very good results in the case of other thermoplastic materials such as, in particular, polylactides (PLA), polyethylene furanoate (PEF), polypropylene (PPF), high density polyethylene (HDPE) or polypropylene (PP).

The advantage of the method according to the invention can be seen in the fact that solid contaminations are removed, and other contaminations have already finished reacting as a result of the degradation reactions forced by the high temperatures. By said finishing reacting according to the invention and separating at high temperatures, little or very few new contaminations arise during further processing of the thermoplastic materials reclaimed according to the invention. This is remarkable because every further processing always means a thermal stress for the thermoplastic materials.

The use of the method according to the invention is particularly advantageous when reclaiming PET for bottles, preforms, tubes or other containers. This is the case because containers made of PET often undergo two deformations at exposure to high temperature and thus are exposed several times to thermal stress during further processing.

Studies by the applicant have shown, that containers which are made of PET based on PET flakes that were treated with the method according to the invention, can be improved in terms of their CIELAB values, in particular in terms of CIELAB b values, by about +5 to +10 points. This means that PET flakes to be reclaimed having a b value in the range of 0 to 15 will have a b value of −5 to 5 after being reclaimed with the method according to the invention.

The invention also relates to a semi-finished product or plastic packaging, in particular beverage bottles, which contain a thermoplastic material, especially polyethylene terephthalate (PET), which has been reclaimed using the method according to the invention. In one embodiment, a semi-finished product or a plastic packaging comprising polyethylene terephthalate (PET) contains a first proportion of at most 40% virgin polyethylene terephthalate (PET), at most 30% PET or advantageously at most 25% PET and a second proportion of at least 60% polyethylene terephthalate (PET), at least 70% PET or advantageously at least 75% PET, which has been reclaimed by the method according to the invention.

Flakes treated with the method according to the invention and thus the semi-finished products and plastic packaging produced therefrom preferably contain less than 0.3 ppm benzene, toluene or xylene. In addition, the method according to the invention enables the production of flakes and thus of semi-finished products and plastic packaging which contain less than 0.03 ppm phenols, such as bisphenol A or bisphenol S, in particular. These products are therefore suitable for use in the food sector for the packaging of food and beverages.

The method according to the invention may be executed primarily in reclamation plants for reclaiming thermoplastic material intended for recycling, in particular polyethylene terephthalate (PET) in the form of flakes, wherein a washing device for washing the flakes made of thermoplastic materials can be connected upstream of the device for performing the method according to the invention, and another method for forming thermoplastic granules can be connected downstream. Furthermore, a device for performing a solid state polymerization method (SSP method) can be connected downstream.

Optional features mentioned can be implemented in any combination, unless they are mutually exclusive. In particular where specific ranges are given, further ranges result from combinations of the minima and maxima mentioned in said ranges.

The invention claimed is:

1. A method for reclaiming thermoplastic materials for recycling, comprising:
    exposing thermoplastic flakes containing contaminations to an oxidative fluid and heat until contaminated flakes are sufficiently chemically and/or physically modified to cause discoloration of the contaminated flakes;
    determining a level of the discoloration of the contaminated flakes using a CIEL*A*B* color model;
    using one or more optical sensors to identify the contaminated flakes based on the CIEL*A*B* color model; and
    separating identified contaminated flakes having a color "b" value greater than 0, a color "a" value less than minus 4 or a color "L" value less than 50 from any remaining thermoplastic flakes.

2. The method according to claim 1, wherein the contaminated flakes are separated when they are above 90° C.

3. The method according to claim 1, wherein the contaminated flakes are forced to react and/or outgas while the method is being carried out by process conditions, and contaminations from the contaminated flakes are separated from a reaction space together with the oxidative fluid.

4. The method according to claim 1, wherein the thermoplastic flakes are washed before the thermoplastic flakes are exposed to the oxidative fluid.

5. The method according to claim 3, wherein the separation of the contaminations from the contaminated flakes takes place prior to extrusion and granulation.

6. The method according to claim 1, wherein agglomerates or flakes, which are stuck or crumbled as a result of exposure to the oxidative fluid, are separated by sifting.

7. The method according to claim 1, wherein the oxidative fluid is an air-gas mixture with an oxygen content of at least 5%.

8. The method according to claim 1, wherein the thermoplastic flakes are exposed to a temperature in a range of 160° C. to 240° C.

9. The method according to claim 3, wherein the oxidative fluid has a relative moisture content in the order of magnitude of 10-6% and $10^{-2}$% when it is fed to the reaction space.

10. The method according to claim 3, wherein the oxidative fluid has a dew point of −10° C. to −100° C. when it is fed to the reaction space, and the thermoplastic flakes are dried to a water content below 50 ppm while passing through the reaction space.

11. The method according to claim 1, wherein a temperature profile during the process is chosen so that more than 30% of the thermoplastic flakes crystallize and wherein low molecular weight contaminations less than 350 Da are expelled by crystallization of the thermoplastic flakes.

12. The method according to claim 3, further comprising stirring the thermoplastic flakes in the reaction space in a stirrer to reduce clumping of the thermoplastic flakes.

13. The method according to claim 1, further comprising separating agglomerations and clumped flakes by at least one mechanical sorting processes.

14. The method according to claim 3, wherein gaseous reaction products and gases which form or migrate out of the flakes are discharged from the reaction space together with the oxidative fluid.

15. The method according to claim 1, further comprising separating solid contaminants including PET mixtures with radical scavengers, adhesives, PVC and/or polystyrene.

16. The method according to claim 1, further comprising washing and pre-sorting the thermoplastic flakes before the thermoplastic flakes are exposed to the oxidative fluid and heat.

17. The method according to claim 1, wherein the thermoplastic material comprises polyethylene terephthalate (PET), polyactide (PLA), polyethylene furanoate (PEF), polypropylene furanate (PPF), high density polyethylene (HDPE) or polypropylene (PP).

18. The semi-finished product or plastic packaging according to claim 1, wherein the thermoplastic material contains less than 0.3 ppm benzene, toluene or xylene and less than 0.03 ppm phenols.

19. A method for reclaiming thermoplastic materials for recycling, comprising:
    exposing thermoplastic flakes containing contaminations to an oxidative fluid and heat until contaminated flakes are sufficiently chemically and/or physically modified to cause discoloration of the contaminated flakes;
    determining a level of the discoloration of the contaminated flakes using a CIEL*A*B* color model;
    using one or more optical sensors to identify the contaminated flakes based on the CIEL*A*B* color model;
    selecting a temperature profile to increase crystallinity of the thermoplastic flakes to an extent of more than 30% to obtain free-flowing granules; and
    separating identified contaminated flakes having a color "b" value greater than 0, a color "a" value less than minus 4 or a color "L" value less than 50 from any remaining thermoplastic flakes.

20. The method of claim 19, further comprising selecting a temperature profile to increase crystallinity of the thermoplastic flakes to an extent of at least 40%.

21. The method of claim 19, further comprising using the oxidative fluid with a dew point of −10° C. to −100° C. to dry the thermoplastic flakes and to have a water content of less than 50 ppm.

22. The method according to claim 19, wherein the contaminated flakes are separated when they are above 90° C.

23. The method according to claim 19, wherein agglomerates or flakes, which are stuck or crumbled as a result of exposure to the oxidative fluid, are separated by sifting.

24. The method according to claim 19, wherein the oxidative fluid is an air-gas mixture with an oxygen content of at least 5%.

25. The method according to claim 19, wherein the thermoplastic flakes are exposed to a temperature in a range of 160° C. to 240° C.

26. The method according to claim 19, wherein the oxidative fluid has a relative moisture content in the order of magnitude of $10^{-6}$% and $10^{-2}$% when it is fed to the reaction space.

27. The method according to claim 19, wherein low molecular weight contaminations less than 350 Da are expelled by crystallization of the thermoplastic flakes.

28. The method according to claim 19, further comprising stirring the thermoplastic flakes in the reaction space in a stirrer to reduce clumping of the thermoplastic flakes.

29. The method according to claim 19, wherein the thermoplastic material comprises polyethylene terephthalate (PET), polyactide (PLA), polyethylene furanoate (PEF), polypropylene furanate (PPF), high density polyethylene (HDPE) or polypropylene (PP).

* * * * *